(12) United States Patent
Nelson

(10) Patent No.: US 12,535,225 B2
(45) Date of Patent: Jan. 27, 2026

(54) ADJUSTMENT BRACKET FOR A COOKING APPLIANCE

(71) Applicant: Haier US Appliance Solutions, Inc., Wilmington, DE (US)

(72) Inventor: Nathan Ernell Nelson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 77 days.

(21) Appl. No.: 18/591,694

(22) Filed: Feb. 29, 2024

(65) Prior Publication Data

US 2025/0277590 A1 Sep. 4, 2025

(51) Int. Cl.
  F24C 15/08 (2006.01)
  F24C 15/00 (2006.01)
  F24C 15/18 (2006.01)

(52) U.S. Cl.
  CPC ............ F24C 15/086 (2013.01); F24C 15/18 (2013.01); *F24C 15/005* (2013.01)

(58) Field of Classification Search
  CPC ...... F24C 15/086; F24C 15/18; F24C 15/005; A47B 91/024; A47B 91/028
  See application file for complete search history.

(56) References Cited

U.S. PATENT DOCUMENTS

| | | | |
|---|---|---|---|
| 2,660,505 A * | 11/1953 | Eck | F25D 23/006 |
| | | | 62/297 |
| 3,814,363 A * | 6/1974 | Brelosky | A47L 15/4253 |
| | | | 248/188.4 |
| 8,511,636 B2 * | 8/2013 | Kucuk | A47L 15/4253 |
| | | | 248/188.4 |
| 8,690,272 B2 | 4/2014 | Anderson et al. | |
| 9,012,815 B2 * | 4/2015 | Cha | F24C 15/18 |
| | | | 219/400 |

(Continued)

FOREIGN PATENT DOCUMENTS

| CN | 206933975 U | 1/2018 |
|---|---|---|
| CN | 210267343 U | 4/2020 |

(Continued)

OTHER PUBLICATIONS

Whirlpool, "Leveling Leg WPW10341186", accessed https://www.whirlpoolparts.com/PartDetail/Leveling-Leg/WPW10341186/2117612 on Feb. 29, 2024, 1 page.

Primary Examiner — Hanh V Tran
(74) Attorney, Agent, or Firm — Dority & Manning, P.A.

(57) ABSTRACT

An adjustment bracket for a cooking appliance defining a vertical direction, a lateral direction, and a transverse direction. The cooking appliance may include a front frame. The front frame may include a frame sill and a side member. The side member may extend along the vertical direction from the frame sill. The frame sill and the side member may define a bottom corner. The adjustment bracket may include a main body extended between a top and a bottom along the vertical direction, an inner edge and an outer edge along the lateral direction, and a front side and a rear side along the transverse direction. The adjustment bracket may also include a second body disposed at the top and the inner edge of the main body. The second body may be wrapped around a portion of the bottom corner to protect the bottom corner.

15 Claims, 6 Drawing Sheets

(56) References Cited

U.S. PATENT DOCUMENTS

| | | | | |
|---|---|---|---|---|
| 9,572,429 B2* | 2/2017 | Basesme | ............. | A47L 15/4253 |
| 9,664,219 B2* | 5/2017 | Haider | ................. | A47B 91/022 |
| 10,663,175 B2* | 5/2020 | Jang | ...................... | F24C 15/086 |
| 11,457,737 B1* | 10/2022 | Stempky | .............. | A47B 88/403 |
| 11,466,864 B2* | 10/2022 | Funk | .................... | F24C 15/086 |
| 11,684,156 B1* | 6/2023 | Stempky | ................. | F24C 15/16 |
| | | | | 312/410 |
| 2002/0033172 A1* | 3/2002 | Ruiz | .................. | A47J 37/0781 |
| | | | | 126/39 B |
| 2006/0168760 A1* | 8/2006 | Espindola | ............ | F25D 23/028 |
| | | | | 16/374 |
| 2016/0195279 A1* | 7/2016 | Naber | ................... | F24C 15/086 |
| | | | | 126/340 |
| 2021/0214271 A1* | 7/2021 | Kim | ......................... | C23D 1/00 |
| 2022/0404029 A1* | 12/2022 | Kim | ....................... | F24C 15/08 |
| 2024/0410590 A1* | 12/2024 | Miranda-Pierce | .... | F24C 15/168 |

FOREIGN PATENT DOCUMENTS

| | | | |
|---|---|---|---|
| DE | 9116814 U1 * | 2/1994 | |
| KR | 20220123973 A | 9/2022 | |
| WO | WO-2014177227 A1 * | 11/2014 | ......... A47L 15/4253 |

* cited by examiner

ADJUSTMENT BRACKET FOR A COOKING APPLIANCE

FIELD OF THE DISCLOSURE

The present subject matter relates generally to a cooking appliance and more particularly to an adjustment bracket for a cooking appliance.

BACKGROUND OF THE DISCLOSURE

Conventional residential and commercial oven appliances generally include a cabinet that includes a cooking chamber for receipt of food items for cooking. Multiple heating elements are positioned within the cooking chamber to provide heat to food items located therein. In addition, conventional oven appliances include a cooktop positioned on a top of the appliance that includes one or more heating elements, such as electric heaters, gas burners, or induction heating elements. Cooking appliances that include both an oven and a cooktop are commonly referred to as "ranges."

Some cooking appliances can include a frame or a chassis that defines the cooking chamber or a drawer recess of the cooking appliance. The frame or chassis can be enameled, for instance, to increase durability or provide a preferred finish to the frame. However, challenges related to the enameled coating a cooking appliance frame can exist. For example, during shipping or handling of the cooking appliance, the portions of the enameled coating may be susceptible to chipping.

Accordingly, a cooking appliance with features for obviating one or more of the aforementioned drawbacks would be useful.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a cooking appliance is provided. The cooking appliance may define a vertical direction, a lateral direction, and a transverse direction. The cooking appliance may include a cabinet defining a cooking chamber and a drawer recess positioned below the cooking chamber. The cooking appliance may also include a front frame defining a chamber opening for the cooking chamber and a drawer opening for the drawer recess. The front frame may include a frame sill and a side member. The frame sill may extend between a first side and a second side along the lateral direction. The side member may extend along the vertical direction from the first side of the frame sill to form a bottom corner of the front frame. The cooking appliance may further include an adjustment bracket attached to the bottom corner of the front frame. The adjustment bracket may include a main body extended between a top and a bottom along the vertical direction, an inner edge and an outer edge along the lateral direction, and a front side and a rear side along the transverse direction. The adjustment bracket may also include a second body disposed at the top and the inner edge of the main body.

In another exemplary aspect of the present disclosure, an adjustment bracket for a cooking appliance is provided. The cooking appliance may define a vertical direction, a lateral direction, and a transverse direction. The cooking appliance may include a front frame. The front frame of the cooking appliance may include a frame sill and a side member. The side member may extend along the vertical direction from the frame sill. The frame sill and the side member may define a bottom corner. The adjustment bracket may include a main body extended between a top and a bottom along the vertical direction, an inner edge and an outer edge along the lateral direction, and a front side and a rear side along the transverse direction. The adjustment bracket may also include a second body disposed at the top and the inner edge of the main body. The second body may be wrapped around a portion of the bottom corner to protect the bottom corner.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
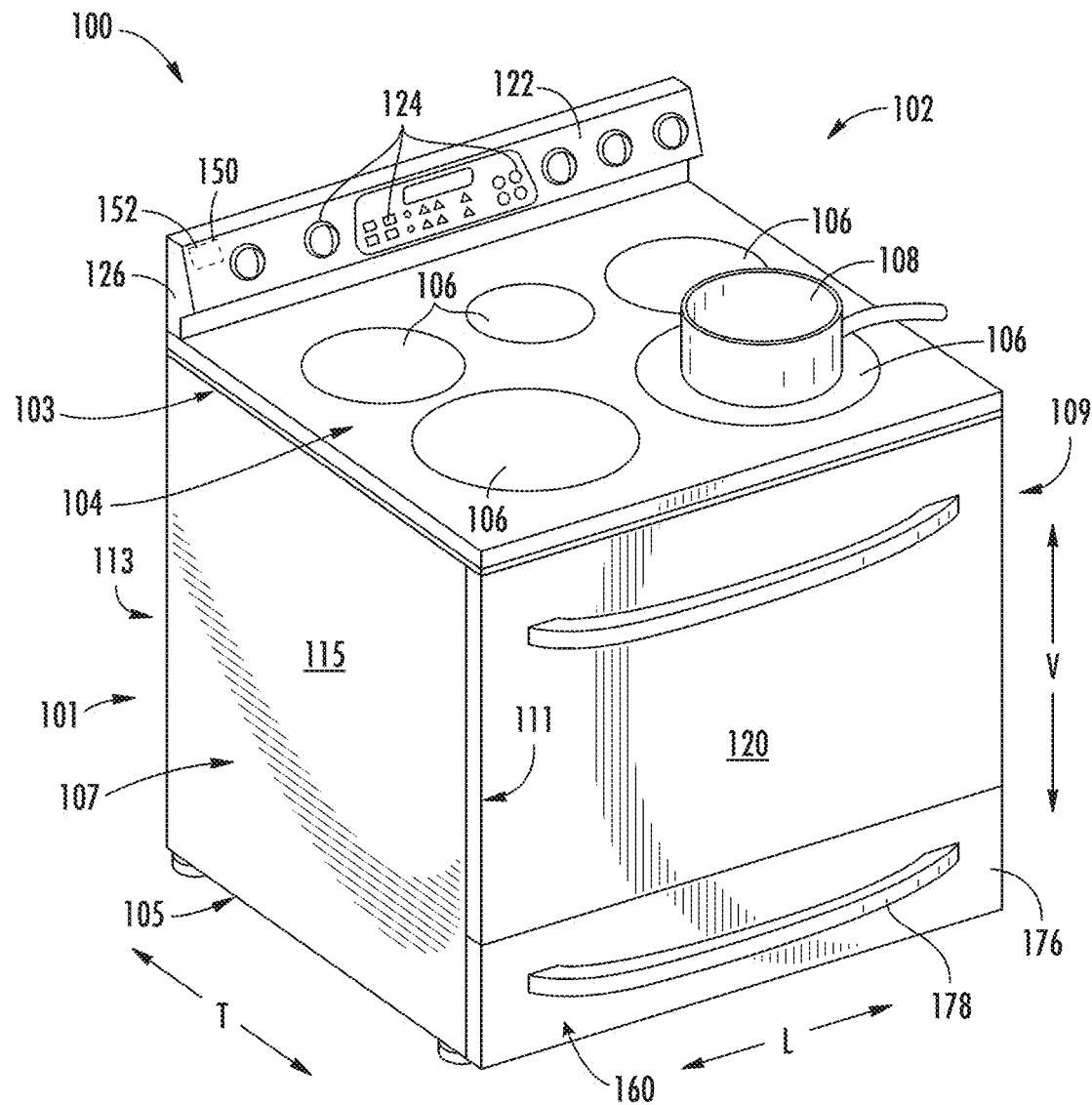
FIG. 1 provides a front perspective view of a cooking appliance according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

Figure 2:
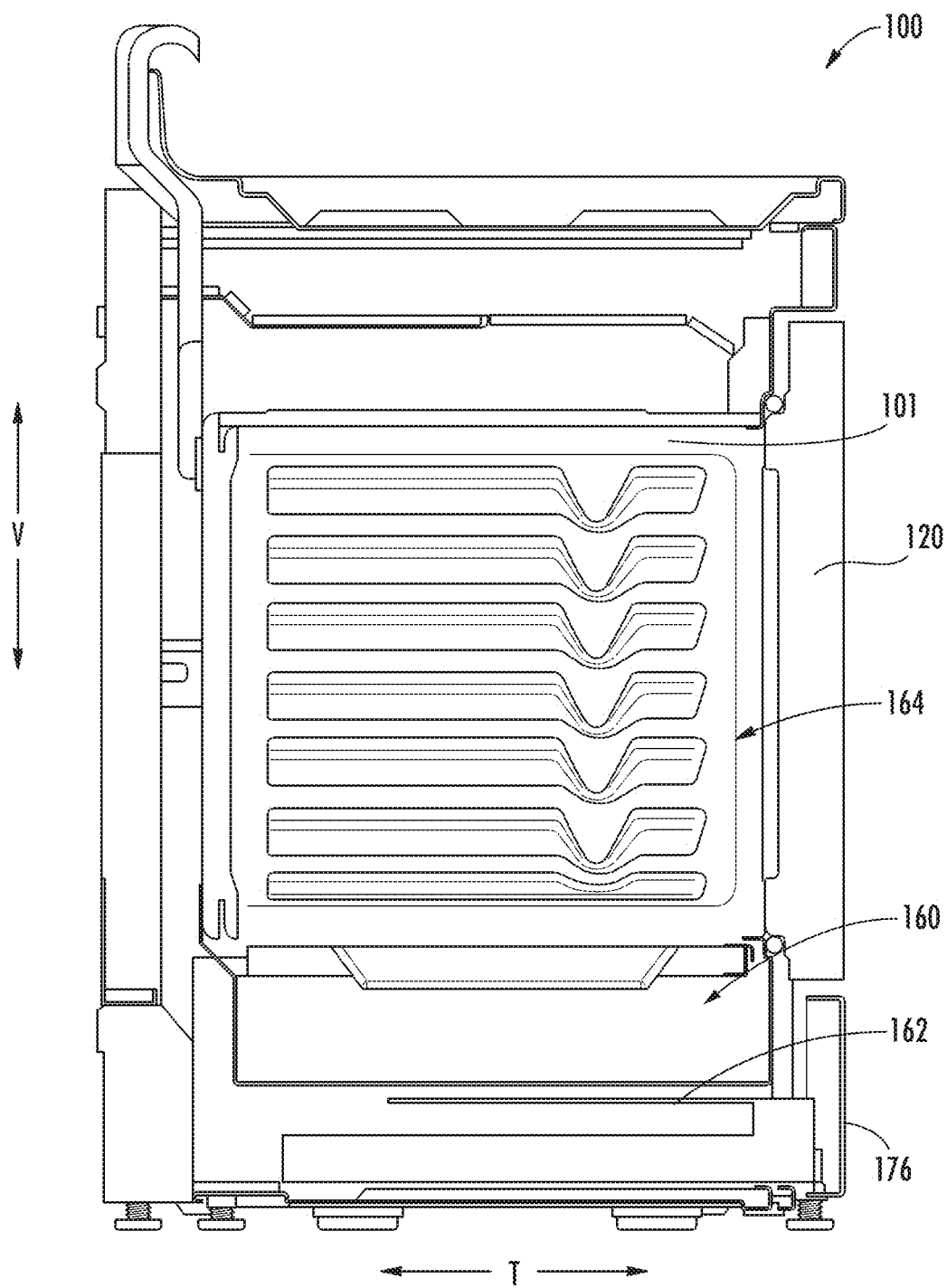
FIG. 2 provides a side cross-sectional view of the exemplary cooking appliance of FIG. 1 according to one or more exemplary embodiments of the present subject matter.

Referring now to the figures, FIG. 1 provides a perspective view of a range appliance 100 including a cooktop 102 and FIG. 2 provides a side cut-away view of the range appliance 100. Range appliance 100 is provided by way of example only and is not intended to limit the present subject matter to the arrangement shown in FIGS. 1 and 2. Thus, the present subject matter may be used with other range appliance 100 or cooktop 102 configurations, e.g., double oven range appliances, gas cooktops, etc. As illustrated, range appliance 100 generally defines a vertical direction V, a lateral direction L, and a transverse direction T, each of which is mutually perpendicular, such that an orthogonal coordinate system is generally defined.

The range appliance 100 may include a cabinet 101. The cabinet 101 may extend between a top 103 and a bottom 105 along the vertical direction V. The cabinet 101 may extend, between a left side 107 and a right side 109 along the lateral direction, and between a front 111 and a rear 113 along the transverse direction T. The cabinet 101 may include a first side wall 115 and a second side wall 117. The first side wall 115 may be positioned at the left side 107 of the cabinet 101. The second side wall 117 may be positioned at the right side 109 of the cabinet 101. A cooking surface 104 of cooktop 102 includes a plurality of heating elements 106. For the embodiment depicted, the cooktop 102 includes five heating elements 106 spaced along cooking surface 104. Moreover, for the embodiment depicted, the heating elements 106 are generally electric heating elements and are positioned at, e.g., on or proximate to, the cooking surface 104.

However, in other embodiments, the cooktop 102 may include any other suitable shape, configuration, or number of heating elements 106. For example, the cooktop 102 may include one or more heating elements 106 spaced along the cooking surface 104, such as three or more heating elements 106 spaced along the cooking surface 104, such as six or more heating elements 106 spaced along the cooking surface 104. As another example, in certain exemplary embodiments, the cooktop 102 may be a gas-powered cooktop. For instance, in such embodiments, the cooktop 102 may include one or more gas burners mounted below or through the cooking surface 104.

As shown in FIG. 1, a cooking utensil 108, such as a pot, pan, or the like, may be placed on a heating element 106 to heat the cooking utensil 108 and cook or heat food items placed in cooking utensil 108. Range appliance 100 also includes a door 120 that permits access to a cooking chamber 164 of range appliance 100, e.g., for cooking or baking of food items therein. A control panel 122 having controls 124 permits a user to make selections for cooking of food items. Although shown on a backsplash or back panel 126 of range appliance 100, control panel 122 may be positioned in any suitable location. Controls 124 may include buttons, knobs, and the like, as well as combinations thereof, or controls 124 may be implemented on a remote user interface device such as a smartphone, as described below. As an example, a user may manipulate one or more controls 124 to select a temperature or a heat or power output for each heating element 106 and the cooking chamber 164. The selected temperature or heat output of heating element 106 affects the heat transferred to cooking utensil 108 placed on heating element 106.

In some embodiments, the range appliance 100 includes a control system 150 for controlling one or more of the plurality of heating elements 106 and the cooking chamber 164. Specifically, the control system 150 may include a controller 152 operably connected to the control panel 122 and controls 124. The controller 152 may be operably connected to each of the plurality of heating elements 106 for controlling a power supply to each of the plurality of heating elements 106 in response to one or more user inputs received through the control panel 122 and controls 124.

Figure 3:
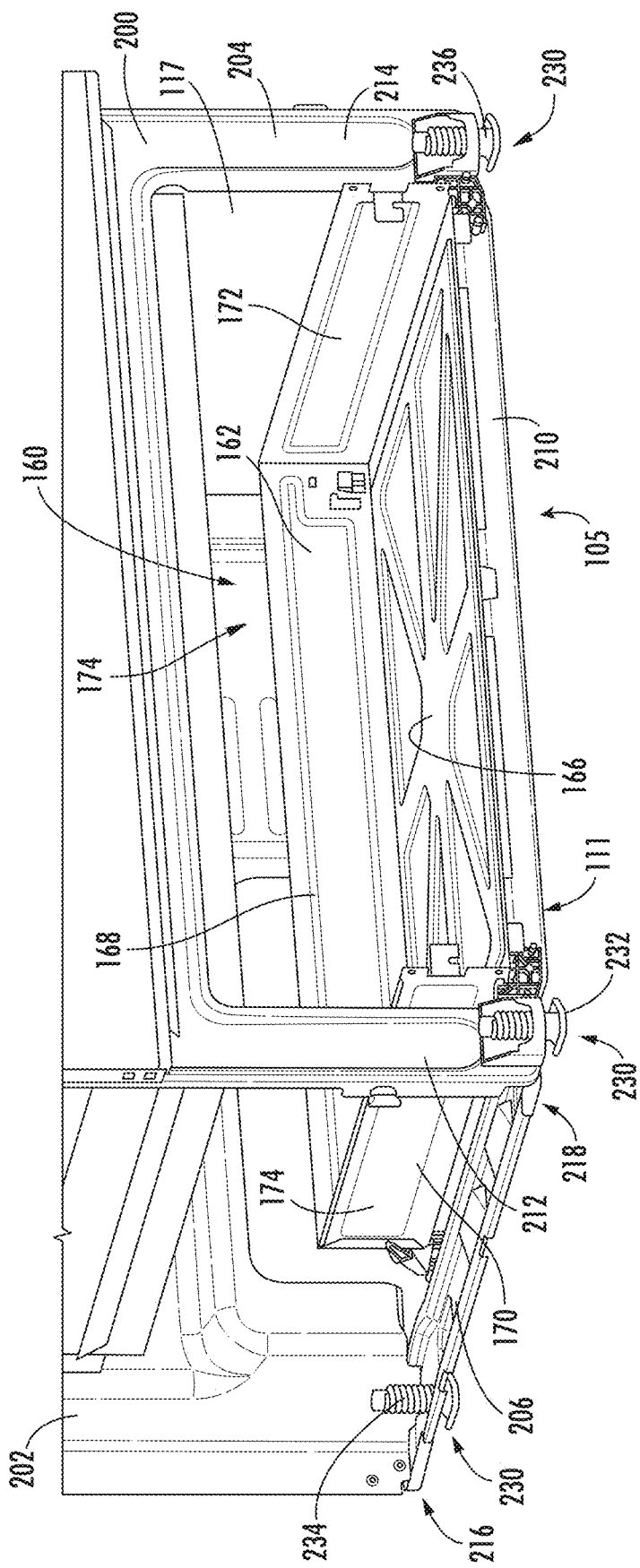
FIG. 3 provides a perspective view of a bottom portion of the exemplary cooking appliance of FIG. 1 with a drawer face and a portion of a first side wall removed.

Referring now to FIG. 3, a perspective view of a bottom portion of the range appliance 100 is provided. The bottom portion of the range appliance 100 may define a drawer recess 160 for receiving a drawer assembly 162. In some embodiments, the range appliance 100 includes a housing assembly 200. The housing assembly 200 may generally be provided as a chassis or a supporting frame for the cabinet 101. For instance, portions of the cabinet 101, such as a first side wall 115 or the second side wall 117 may be attached to or mounted to (e.g., via welds, mechanical fasteners, etc.) the housing assembly 200 to form the cabinet 101. In addition, the housing assembly 200 may generally include a rear frame 202, a front frame 204, a first base rail 206, and a second base rail 208. The front frame 204 and the rear frame 202 may be spaced apart along the transverse direction T. For instance, the front frame 204 and the rear frame 202 may be positioned at the front 111 and the rear 113 of the range appliance 100, respectively. In some embodiments, the front frame 204 and rear frame 202 define the front 111 or the rear 113 of the cabinet 101, respectively. The front frame 204 may extend between the top 103 (e.g., the top of the cooking chamber) and the bottom 105 of the range appliance 100.

In some embodiments, the front frame 204 includes a frame sill 210, a first side member 212, and a second side member 214. The frame sill 210 may be positioned at the bottom of the front frame 204. In addition, the frame sill 210 may be positioned at or proximate the front 111 of the range appliance 100. The frame sill 210 may generally extend along the lateral direction L between the first side member 212 and the second side member 214. The first side member 212 may be extended along the vertical direction V from the frame sill 210 at the left side 107 of the range appliance 100. The second side member 214 may be extended along the vertical direction V from the frame sill 210 at the right side 109 of the range appliance 100. In some embodiments, the front frame 204, and the components thereof (e.g., the first side member 212, the second side member 214, or the frame sill 210) may include an enameled coating. For instance, a substantially vitreous or glassy inorganic coating may be bonded to the front frame 204 (e.g., by thermal fusion) to provide durability or a glossy appearance to the front frame 204.

In some embodiments, the front frame 204 may define the opening for the drawer recess 160. For instance, the frame sill 210, the first side member 212, and the second side member 214 may together define the opening for the drawer recess 160. In such embodiments, the frame sill 210 is positioned at the bottom of the front frame 204. In addition, the frame sill 210 may be positioned at or proximate the front 111 of the range appliance 100. The frame sill 210 may generally extend along the lateral direction L between the first side member 212 and the second side member 214. The first side member 212 may be extended along the vertical direction V from the frame sill 210 at the left side 107 of the range appliance 100. The second side member 214 may be extended along the vertical direction V from the frame sill 210 at the right side 109 of the range appliance 100.

In some embodiments, a height adjustment assembly 230 may be attached to the housing assembly 200. The height adjustment assembly 230 may be configured to adjust a cooktop height of the range appliance 100. For instance, the height adjustment assembly 230 may be capable of increasing or decreasing the total distance between the cooktop 102 and a predetermined ground surface that the range appliance 100 may be positioned on. In some embodiments, the height adjustment assembly 230 includes a first front leveling leg 232, a first rear leveling leg 234, a second front leveling leg 236, a second rear leveling leg 238. As will be appreciated in more detail below, one or more (e.g., each) of the first front leveling leg 232, the first rear leveling leg 234, the second front leveling leg 236, or the second rear leveling leg 238 may be movably mounted to the housing assembly 200 to adjust the cooktop height of the range appliance 100.

In some embodiments, the drawer recess 160 may be provided underneath a cooking chamber 164, for example. A user may store various items (e.g., cooking utensils 108 or the like) within drawer recess 160. Additionally or alternatively, drawer recess 160 may be used as a temporary storage area for food (e.g., as a warming zone or area). According to some embodiments, drawer recess 160 may be an additional cooking or baking zone, in which food items may be cooked or baked. It should be noted that drawer recess 160 may be used for any suitable purposes, and the disclosure is not limited to those examples given herein. The opening to drawer recess 160 may be defined in the lateral direction L and vertical direction V. In detail, drawer recess 160 may be configured such that drawer assembly 162 is withdrawn in the transverse direction T from drawer recess 160.

Drawer assembly 162 may include a main panel 166, a rear panel 168, a first side panel 170, and a second side panel 172. Accordingly, main panel 166, rear panel 168, first side panel 170, and second side panel 172 may form a drawer body 174 having a cuboid shape into which various items may be placed. It should be noted that drawer body 174 may be formed from a single piece and bent into the cuboid shape according to certain embodiments. Drawer assembly 162 may include a front panel or door face 176 including a handle 178 (see e.g., FIG. 1) used to withdraw and insert drawer assembly 162 into drawer recess 160. When assembled, first side panel 170 and second side panel 172 may be defined in the transverse direction T and the vertical direction V. Rear panel 168 may be defined in the lateral direction L and the vertical direction V. Main panel 166 may be defined in the lateral direction L and the transverse direction T. A rear portion of each of first side panel 170 and second side panel 172 may extend further in the transverse direction T than a position of rear panel 168. In other words, each of first side panel 170 and second side panel 172 may define an overhang or extension in the transverse direction T (e.g., behind rear panel 168 in the transverse direction T).

Figure 4:
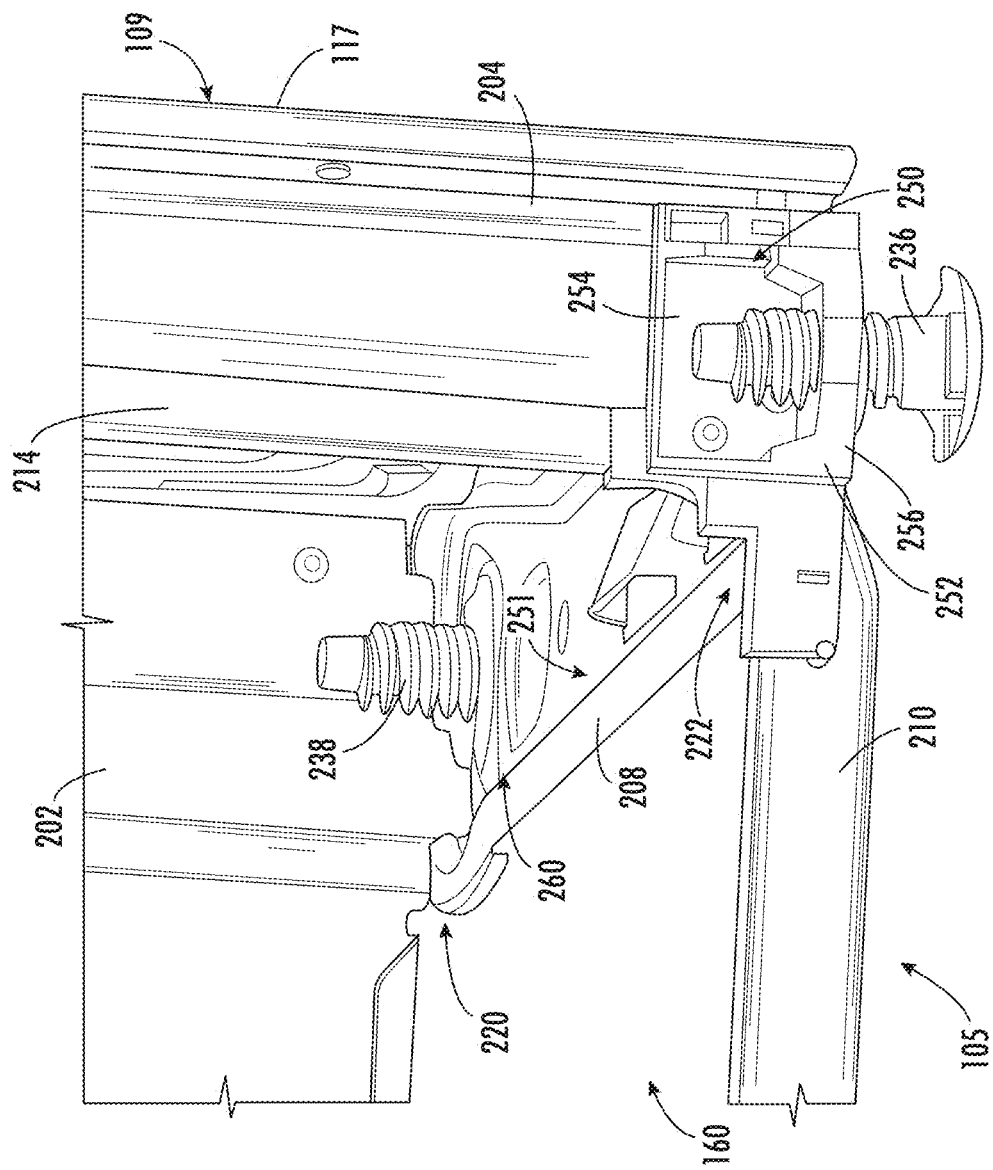
FIG. 4 provides a close-up perspective view of a front corner of a housing assembly of the exemplary cooking appliance of FIG. 1.
Figure 5:
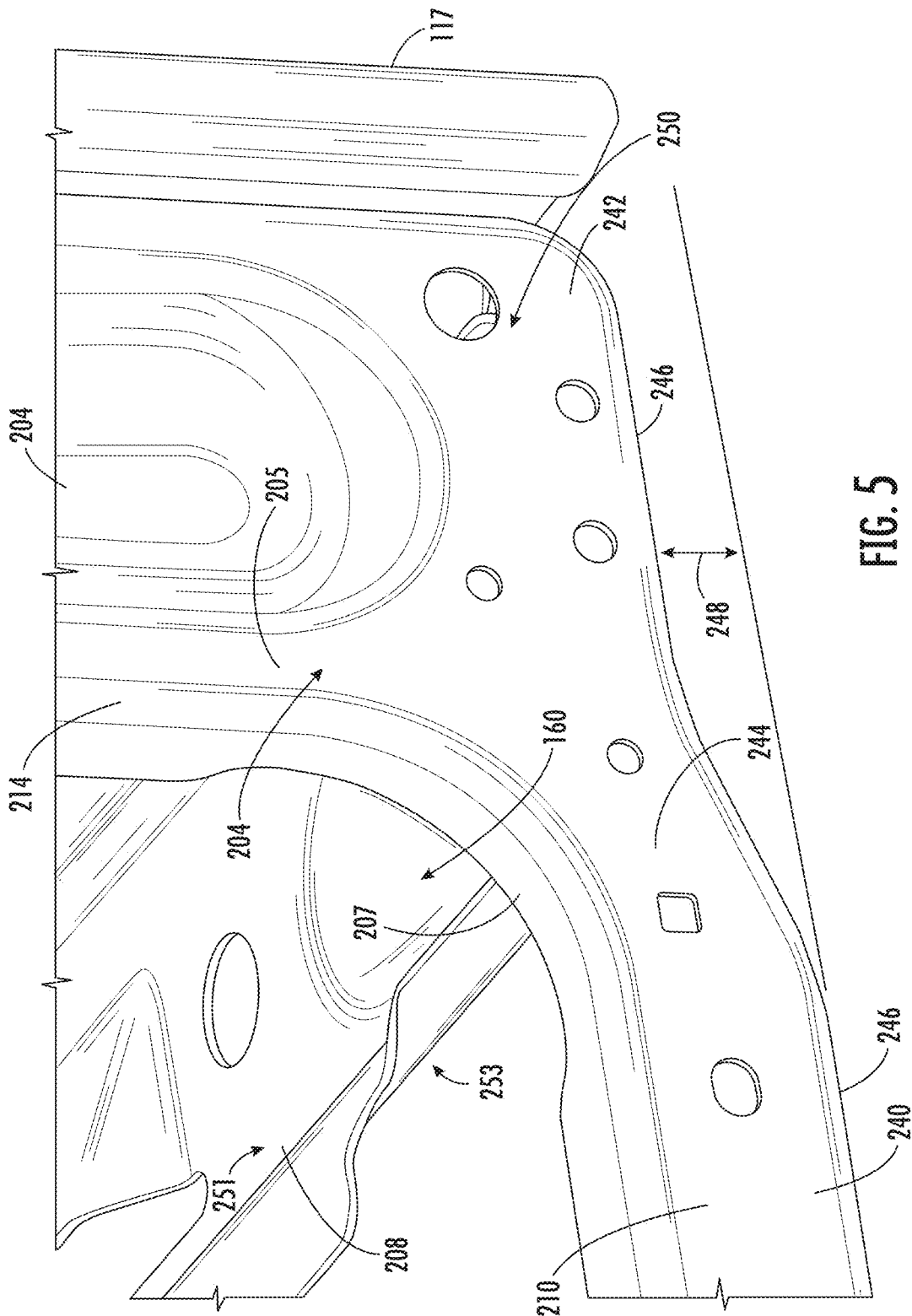
FIG. 5 provides a close-up perspective view of a front corner of a housing assembly of the exemplary cooking appliance of FIG. 1 with a front adjustment bracket and a front leveling leg removed.

Referring now specifically to FIGS. 4 and 5, close-up perspective views of a bottom portion of the right side 109 of the range appliance 100 are provided. As should be appreciated, for the purposes of clarity and brevity, only the bottom portion of the right side 109 of the range appliance 100, and components positioned at or proximate to the bottom portion of the right side 109 of range appliance 100 are illustrated and described in more detail below. One of ordinary skill in the art would recognize that the structure, configuration, or function of the components illustrated and described below may be mirrored or identical to the structure, configuration, or function of components positioned at or proximate to the first side of the range appliance 100. For instance, the structure, function, or configuration of the second base rail 208 described below may mirror or may be identical to the structure, function, or configuration of the first base rail 206. For example, the second base rail 208 may include a top surface 251 and a bottom surface 253 spaced apart along the vertical direction V. The first base rail 206 may include a top surface and a bottom surface that mirror or are identical to the top surface 251 and the bottom surface 253 of the second base rail 208.

In some embodiments, the frame sill 210 includes a first portion 240, a second portion 242, and a jog 244. The first portion 240 may be the main body of the frame sill 210. For instance, the first portion 240 may extend along the lateral direction L across the majority of housing assembly 200. The jog 244 may be positioned between the first portion 240 and the second portion 242. The jog 244 may define an offset or displacement of the bottom edge of the frame sill 210. For instance, the jog 244 may raise or lift the second portion 242 along the vertical direction V by a predetermined amount 248. Particularly, the jog 244 may raise or lift a bottom edge 246 of the frame sill 210 by a predetermined amount 248. As will be appreciated, this offset, or displacement, may be utilized to accommodate the second base rail 208. In particular, the jog 244 may allow the second base rail 208 to sit within the housing assembly 200. As illustrated, in FIG. 5, the second side member 214 may be extended along the vertical direction V from the second portion 242 of the frame sill 210. The second portion 242 of the frame sill 210 and the second side member 214 may together define a bottom corner 250 of the front frame 204.

In some embodiments, when the second base rail 208 is attached to the second portion 242 of the frame sill 210, the second base rail 208 may be positioned within the housing assembly 200 (e.g., due to the vertical positioning of the second portion 242 of the frame sill 210). That is, the bottom surface 253 of the second base rail 208 may be, at least in part, positioned at or vertically above, the bottom edge 246 of the second portion 242 of the frame sill 210. In this regard, the second base rail 208 may be elevated above the bottom most point of the frame sill 210 (e.g., the bottom edge 246 of the first portion 240 of the frame sill 210) such that the second base rail 208 is positioned "within" the housing assembly 200.

As briefly mentioned above, the height adjustment assembly 230 may include a second front leveling leg 236 and a second rear leveling leg 238. The second front leveling leg 236 may be movably mounted to the front frame 204 to adjust the cooktop height defined by a cooktop of the range appliance 100. Particularly, second front leveling leg 236 may be movably mounted to the front frame 204 within a front adjustment bracket 252. The front adjustment bracket 252 may generally include a main body 254 and a leg mount 256. The main body 254 may be mounted to the front face of the front frame 204 at the bottom corner 250. The leg mount 256 may be extended from the main body 254 along the transverse direction T. The leg mount 256 may define a leg aperture (e.g., FIG. 6). The second front leveling leg 236 may be movably mounted within the leg mount 256 to adjust the cooktop height. For instance, the second front leveling leg 236 may include a threaded portion that is movably mounted within a complementary threaded portion within the leg aperture.

The transverse extension of the leg mount 256 may advantageously position the second front leveling leg 236 in front of the front frame 204. The second front leveling leg 236 may include an axis of rotation. The axis of rotation may extend axially through a center of the second front leveling leg 236. The axis of rotation of the second front leveling leg 236 may be positioned in front of the second side member 214 (e.g., along the transverse direction T). Moreover, the positioning of the second front leveling leg 236 may advantageously allow the range appliance 100 to minimize the use of counterweight, for instance, counterweight that may be utilized to reduce or mitigate tipping of the range appliance 100.

The second rear leveling leg 238 may be movably mounted within the second base rail 208 to adjust the cooktop height. For instance, the second rear leveling leg 238 may include a threaded portion that is movably mounted within a complementary threaded aperture defined at a rear portion 260 of the second base rail 208. The rear portion 260 of the second base rail 208 may be positioned at, or proximate to, the rear end 220 of the second base rail 208. That is, the rear portion 260 of the second base rail 208 may be positioned closer to the rear end 220 of the second base rail 208 than the front end 222 of the second base rail 208, such as within the rear twenty five percent of the transverse length of the second base rail 208, within the rear fifteen percent of the transverse length of the second base rail 208, or within the rear five percent of the transverse length of the second base rail 208.

As an illustrative example, a user may rotate the second front leveling leg 236 or the second rear leveling leg 238 within the respective complementary threaded aperture to raise or lower the cooktop height. In some exemplary embodiments, the second front leveling leg 236 or the second rear leveling leg 238 can be raised or lowered independently of each other to "level" the range appliance 100 and more particularly, the cooktop 102 of the range appliance 100. In some other embodiments, the second front leveling leg 236 or the second rear leveling leg 238 can be raised or lowered together raise or lower the cooktop height.

As should be appreciated, the first front leveling leg 232 or the first rear leveling leg 234 may also be raised or lower independently to "level" the range appliance 100, and more particularly, the cooktop 102 of the range appliance 100. In this regard, first front leveling leg 232, the first rear leveling leg 234, the second front leveling leg 236, or the second rear leveling leg 238 may be raised or lowered independently of each other to "level" the range appliance 100, and more particularly, the cooktop 102 of the range appliance 100. Moreover, the first front leveling leg 232 or the first rear leveling leg 234 may be raised or lowered together to raise or lower the cooktop height. In this regard, first front leveling leg 232, the first rear leveling leg 234, the second front leveling leg 236, or the second rear leveling leg 238 may be raised or lowered together to raise or lower the cooktop height.

Figure 6:
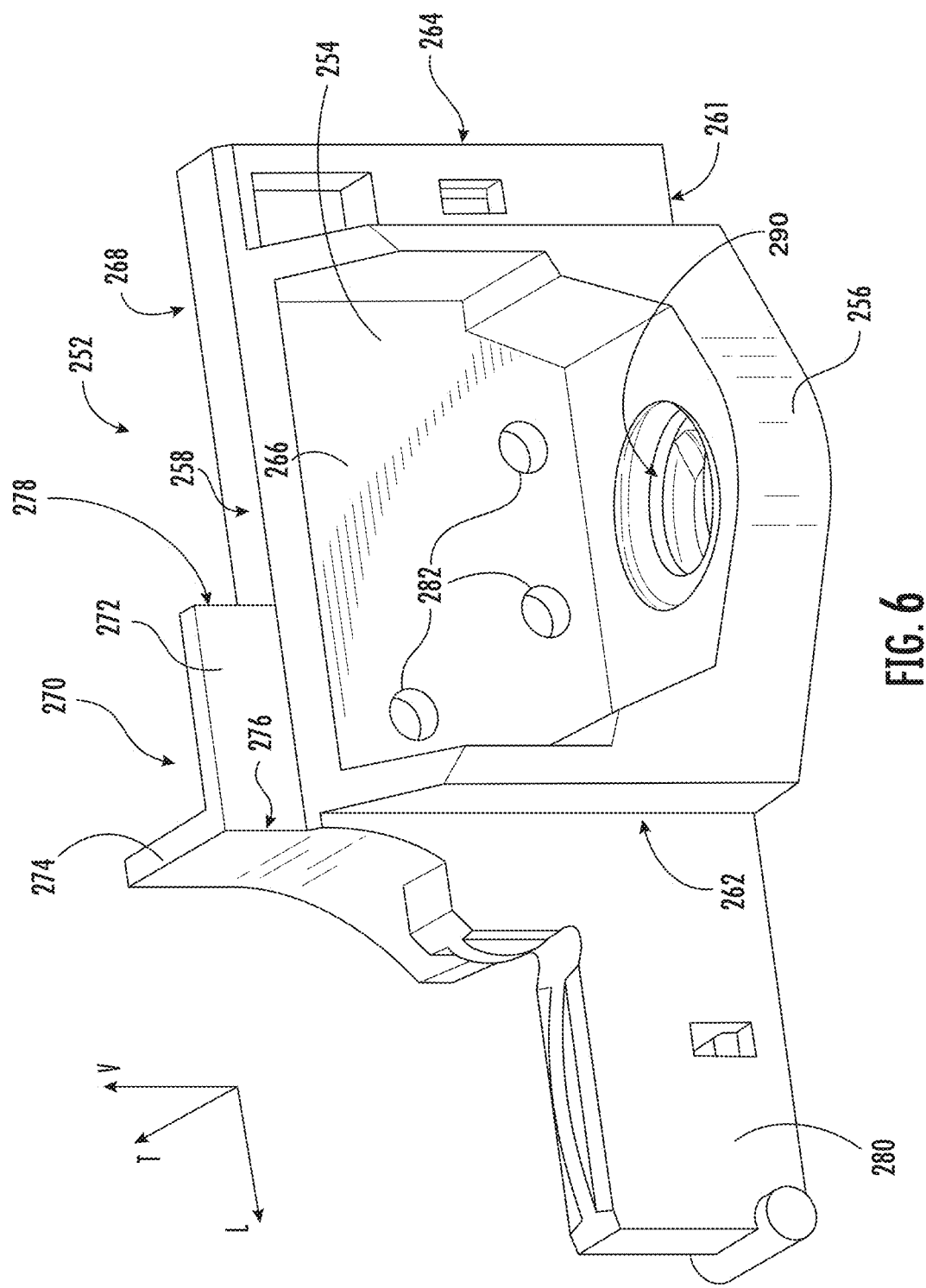
FIG. 6 provides a perspective view of a front adjustment bracket according to an exemplary embodiment of the present disclosure.

Referring now to FIG. 6, a perspective view of the front adjustment bracket 252 is provided. As briefly mentioned above the front adjustment bracket 252 may generally include a main body 254 and a leg mount 256. The main body 254 may be generally rectangular in shape, extending along the vertical direction V and the lateral direction L. For instance, the main body 254 may be extended between a top 258 and a bottom 261 along the vertical direction V, an inner edge 262 and an outer edge 264 along the lateral direction L, and a front side 266 and a rear side 268 along the transverse direction T. Front side 266 may face a front of range appliance 100. Accordingly, rear side 268 may be provided opposite front side 266 and thus face a rear of range appliance 100.

The front adjustment bracket 252 may include a second body 270 extended from the main body 254. The second body 270 may be provided to protect a portion of the front frame 204. Specifically, the second body 270 may be provided to protect a portion of the bottom corner 250 of the front frame 304. For example, referring briefly to FIG. 5, the bottom corner 250 may include a front trim 205 and a side trim 207. The front trim 205 may be positioned at an inner portion of the second side member 214. The side trim 207 may be positioned at the jog 244 (e.g., between the first portion 240 of the frame sill 210 and the second portion 242 of the frame sill 210). The front trim 205 and the side trim 207 may be relatively thin portions of the front frame 204 (e.g., when compared to other portions of the front frame 204 such as the frame sill 210). For example, a lateral width of the front trim 205 may be thinner than surrounding portions of the front frame 204, for instance, may be thinner than the vertical length of the first portion 240 of the frame sill 210. As another example, the transverse width of the side trim 207 may be thinner than the surrounding portions of the front frame 204, for instance, may be thinner the transverse width of the first portion 240 of the frame sill 210.

The second body 270 may cover and obscure visibility of (e.g., to a user of the range appliance 100), at least a portion of the front trim 205 or the side trim 207 of the front frame 204. For instance, the second body 270 may be positioned in front of (e.g., along the transverse direction T) or beside (e.g., along the lateral direction L) the front frame 204. In this regard, the second body 270 may be configured to obscure the visibility of areas of the front trim 205 or the side trim 207 where chipping or cracking of the enameled coating may occur. For instance, during shipping or handling of the range appliance 100, the range appliance 100 may experience a severe shock (e.g., a drop or a hit). The severe shock experienced by the range appliance 100 may cause chipping or cracking of the enameled coating at portions of the front trim 205 or the side trim 207. The second body 270 is positioned to obscure visibility of areas where chipping or cracking of the enameled coating (e.g., to a user of the range appliance 100) is prone to occur. Thus, the second body 270 may maintain an acceptable appearance of the front frame 204 to a user of the range appliance 100.

In some embodiments, the second body 270 includes a front guard 272 and a side guard 274 for protecting a portion of the bottom corner 250 of the front frame 204. The front guard 272 may be provided to protect the front trim 205 of the front frame 204. The side guard 274 may be provided to obscure visibility (e.g., to a user of the range appliance 100) of at least a portion the side trim 207 of the front frame 204. The front guard 272 may be extended along the vertical direction V from the top 258 of the main body 254. Specifically, the front guard 272 may be extended along the vertical direction V from the top 258 of the main body 254 proximity to the front side 266 of the main body 254. In addition, the front guard 272 may be disposed at the inner edge 262 of the main body 254. The front guard 272 may be extended between a first side 276 and a second side 278 along the lateral direction L. The first side 276 may be disposed at the inner edge 262 of the main body 254.

The side guard 274 may be extended along the vertical direction V from the inner edge 262 of the main body 254. The side guard 274 may be extended along the transverse direction T from the first side 276 of the front guard 272, for instance, toward a rear of the range appliance 100. In this regard, the side guard 274 may be positioned approximately perpendicular to the front guard 272. When the front adjustment bracket 252 is attached to the front frame 204, the front guard 272 and the side guard 274 may wrap around the front trim 205 or the side trim 207 of the front frame 204. In this regard, during a shipping or handling operation, the second body 270 may be capable of protecting the front frame 204, and more particularly, the front guard 272 may be capable of protecting the enamel coating on the front trim 205 or side guard 274 may be capable of protecting enamel coating on the side trim 207, from chipping. Additionally or alternatively, the front adjustment bracket 252 may include a drawer guide 280 extended from the main body 254. For instance, the drawer guide 280 may be extended from the inner edge 262 of the main body 254 along the lateral direction L. The drawer guide 280 may be provided to guide the drawer assembly 162, for instance, into or out of the drawer recess 160.

Front adjustment bracket 252 may also define may include a plurality of fastener apertures 282. In detail, the plurality of fastener apertures 282 may be defined through main body 254 along the transverse direction T. The plurality of fastener apertures 282 may extend from front side 266 to rear side 268 (e.g., along the transverse direction T). Further, the plurality of fastener apertures 282 may be spaced apart along each of the vertical direction V and the lateral direction L. As shown in the figures, three fastener apertures 282 may be provided, however it should be understood that the number of fastener apertures 282 shown is by way of example only, and that any suitable number of fastener apertures 282 may be provided. Accordingly, front adjustment bracket 252 may be selectively fastened to range appliance 100 via one or more fasteners (such as screws, bolts, pins, rivets, or the like).

The leg aperture 290 may be defined as a through hole through leg mount 256. For instance, leg aperture 290 may be defined axially along the vertical direction V. Leg aperture 290 may be a threaded hole. For instance, leg aperture 290 may include features for receiving a threaded portion of the second front leveling leg 236. In this regard, the second front leveling leg 236 may be movably mounted within leg aperture 290 via threaded engagement to adjust the cooktop height of range appliance.

Although aspects of the present subject matter are described herein in the context of a single oven appliance, it should be appreciated that range appliance 100 is provided by way of example only. Other oven or range appliances having different configurations, different appearances, or different features may also be utilized with the present subject matter, e.g., double ovens, standalone cooktops, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance defining a vertical direction, a lateral direction, and a transverse direction, the cooking appliance comprising:
   a cabinet defining a cooking chamber and a drawer recess positioned below the cooking chamber;
   a front frame defining a chamber opening for the cooking chamber and a drawer opening for the drawer recess, the front frame comprising a frame sill and a side member, the frame sill extending between a first side and a second side along the lateral direction, the side member extending along the vertical direction from the first side of the frame sill to form a bottom corner of the front frame; and
   an adjustment bracket attached to the bottom corner of the front frame, the adjustment bracket comprising:
      a main body extended between a top wall and a bottom wall along the vertical direction, an inner edge and an outer edge along the lateral direction, and a front wall and a rear wall along the transverse direction; and
      a second body disposed at the top wall and the inner edge of the main body, wherein the second body comprises a front guard for protecting a front trim of the bottom corner,
      wherein the front guard is extended upward from the top wall of the main body along the vertical direction,
      wherein the front guard is extended between a first side wall and a second side wall along the lateral direction, and
      wherein the first side wall is disposed at the inner edge of the main body.

2. The cooking appliance of claim 1, wherein the frame sill comprises a first portion, a jog, and a second portion, wherein the jog is positioned between the first portion and the second portion to raise the second portion along the vertical direction by a predetermined amount, wherein the second portion is positioned at the first side of the frame sill, and wherein the side member extends along the vertical direction from the second portion of the frame sill to form the bottom corner of the front frame.

3. The cooking appliance of claim 1, wherein the second body further comprises a side guard for protecting a side trim of the bottom corner, wherein the side guard is extended along the vertical direction from the top wall of the main body, wherein the side guard is positioned at the inner edge of the main body, and wherein the side guard is extended along the transverse direction from the first side of the front guard toward a rear of the cabinet.

4. The cooking appliance of claim 3, wherein the front frame comprises an enamel coating, and wherein the enamel coating of the bottom corner of the front frame is protected by the second body.

5. The cooking appliance of claim 1, wherein the adjustment bracket further comprises a leg mount, wherein the leg mount extends along the transverse direction from the front side of the main body.

6. The cooking appliance of claim 5, wherein the leg mount defines a leg aperture for movably receiving a leveling leg, and wherein a cooktop height of the cooking appliance is adjusted by rotating the leveling leg within the leg aperture.

7. The cooking appliance of claim 1, wherein the main body defines one or more fastener apertures for receiving one or more mechanical fasteners, and wherein the main body is fastened to the bottom corner of the front frame via the one or more mechanical fasteners.

8. The cooking appliance of claim 1, wherein the side member is a first side member, wherein the first side member is extended along the vertical direction from the first side of the frame sill, wherein the front frame further comprises a second side member, wherein the second side member is extended along the vertical direction from the second side of the frame sill, wherein the bottom corner is a first bottom corner at the first side of the frame sill, and wherein the second side of the frame sill and the second side member define a second bottom corner at the second side of the frame sill.

9. The cooking appliance of claim 8, wherein the adjustment bracket is a first adjustment bracket, wherein the first adjustment bracket is attached to the first bottom corner, wherein the cooking appliance further comprises:
a second adjustment bracket attached to the second bottom corner, the second adjustment bracket defining a leg aperture for movably receiving a second leveling leg,
wherein a cooktop height of the cooking appliance is adjusted by rotating the second leveling leg within the leg aperture of the second adjustment bracket.

10. An adjustment bracket for a cooking appliance, the cooking appliance defining a vertical direction, a lateral direction, and a transverse direction, the cooking appliance comprising a front frame, the front frame comprising a frame sill and a side member extending along the vertical direction from the frame sill, the frame sill and the side member defining a bottom corner, the adjustment bracket comprising:
a main body extended between a top wall and a bottom wall along the vertical direction, an inner edge and an outer edge along the lateral direction, and a front wall and a rear wall along the transverse direction; and
a second body disposed at the top the top wall and the inner edge of the main body,
wherein the second body is wrapped around a portion of the bottom corner to protect the bottom corner,
wherein the second body comprises a front guard that is extended upward from the top wall of the main body along the vertical direction,
wherein the front guard is extended between a first side wall and a second side wall along the lateral direction, and
wherein the first side wall is disposed at the inner edge of the main body.

11. The adjustment bracket of claim 10, wherein the second body further comprises a side guard for protecting a side trim of the bottom corner, wherein the side guard is extended along the vertical direction from the inner edge of the main body, and wherein the side guard is extended along the transverse direction from the first side of the front guard toward a rear of the cooking appliance.

12. The adjustment bracket of claim 11, wherein the front frame includes an enamel coating, and wherein the enamel coating of the bottom corner of the front frame is protected by the second body.

13. The adjustment bracket of claim 10, wherein the adjustment bracket further comprises a leg mount, wherein the leg mount is extended along the transverse direction from the front side of the main body.

14. The adjustment bracket of claim 13, wherein the leg mount defines a leg aperture for movably receiving a leveling leg, and wherein a cooktop height of the cooking appliance is adjusted by rotating the leveling leg within the leg aperture.

15. The adjustment bracket of claim 10, wherein the main body defines one or more fastener apertures for receiving one or more mechanical fasteners, and wherein the main body is fastened to the bottom corner of the front frame via the one or more mechanical fasteners.

* * * * *